(12) United States Patent
Schmidt

(10) Patent No.: US 8,096,162 B2
(45) Date of Patent: Jan. 17, 2012

(54) HYDRAULIC PROCESSING PINCERS

(76) Inventor: Heiko Schmidt, Lappersdorf (DE)

( * ) Notice: Subject to any disclaimer, the term of this patent is extended or adjusted under 35 U.S.C. 154(b) by 675 days.

(21) Appl. No.: 12/223,974

(22) PCT Filed: Feb. 15, 2006

(86) PCT No.: PCT/DE2006/000271
§ 371 (c)(1),
(2), (4) Date: Oct. 29, 2008

(87) PCT Pub. No.: WO2007/093136
PCT Pub. Date: Aug. 23, 2007

(65) Prior Publication Data
US 2009/0301164 A1 Dec. 10, 2009

(51) Int. Cl.
*B21D 17/02* (2006.01)
*B21J 7/46* (2006.01)

(52) U.S. Cl. .......................... 72/444; 72/441; 72/453.01

(58) Field of Classification Search .................. 72/441, 72/444, 447, 453.01, 453.03, 453.05
See application file for complete search history.

(56) References Cited

U.S. PATENT DOCUMENTS

| | | | | |
|---|---|---|---|---|
| 4,014,204 A * | 3/1977 | Hanni et al. | ..................... | 72/413 |
| 4,148,209 A * | 4/1979 | Bessho | ........................... | 72/441 |
| 4,509,357 A * | 4/1985 | Zbornik | ......................... | 72/384 |
| 4,691,553 A * | 9/1987 | Barber | ............................ | 72/444 |
| 5,027,683 A * | 7/1991 | Kakimoto | ....................... | 72/444 |

FOREIGN PATENT DOCUMENTS

| | | |
|---|---|---|
| DE | 35 05 463 | 8/1986 |
| DE | 103 59 879 | 8/2004 |
| EP | 0 007 776 | 2/1980 |

\* cited by examiner

*Primary Examiner* — David Jones
(74) *Attorney, Agent, or Firm* — Welsh Flaxman & Gitler LLC

(57) ABSTRACT

The invention relates to a novel design of hydraulic processing pincers for processing workpieces, with a tool which, in a first tool part, has an axially displaceable tool plunger which, with a first end or with a tool provided there and an opposite work rest, forms a working region or a working gap and can be moved with the first end towards and away from the work rest, and made up of a hydraulic actuating device for applying a force to the tool plunger via a movable pressure-transmitting element, said force moving said tool plunger in the direction of the work rest. The piston and/or the piston rod are/is designed with a cavity in which the tool plunger is accommodated in its initial position at least over part of its length.

6 Claims, 4 Drawing Sheets

HYDRAULIC PROCESSING PINCERS

BACKGROUND OF THE INVENTION

The invention relates to hydraulic processing grippers or hydraulic processing pincers.

"Processing gripper", according to the invention, generally refers to a device with which workpieces can be gripped, machined or processed hydraulically and, therefore, with a high application of force. The processing gripper comprises at least two elements that can move in relation to each other and form a working gap between them, one of the elements is a hydraulically actuated press ram and the other element forms a workpiece assembly or a further workpiece element.

A generic hydraulic processing gripper is known in the art from DE 103 59 879 and is used to provide functional elements or connecting elements, such as nuts, bolts etc. in workpieces made of sheet metal by means of joining and subsequent pressing.

Especially for pressing there is a press ram or plunger, which for closing of the processing gripper during feeding can be moved from a press ram or plunger starting position into a working position, in which the plunger is supported on the functional element to be inserted into the workpiece and the functional element is supported on the workpiece. A hydraulic pressure cylinder then fixes the functional element in the workpiece by means of pressing, i.e. by means of permanent material deformation for example of the functional element and/or of the workpiece.

The basic advantage of the known setting gripper is that the feed movement of the press ram or plunger can be executed with a large stroke, and with reduced force, while the increased force required for processing or pressing when the processing gripper is closed is generated by the pressure cylinder, with an extremely short stroke. In order to achieve this, the processing gripper is designed so that the pressure piston of the pressure cylinder is arranged on the same axis with the press ram or plunger. As a result, the plunger, when advanced, is at an axial distance from the pressure piston of the pressure cylinder. Via a pressure element, which can be moved radially to the axis of the press ram, the distance between the pressure piston of the pressure cylinder and the advanced press ram is bridged. The pressure piston then acts on the press ram via this pressure element during pressing. When the press ram is retracted into starting position with the processing gripper open, the pressure element is located to the side of the press ram and therefore provides the free space necessary for the press ram to return to its starting position.

The disadvantage of the known processing gripper is its relatively large overall height, which is due in particular to the fact that the size of the pressure transfer element or pressure element in the axis direction of the workpiece is at least equal to the stroke of this press ram from its starting position to the working position.

It is an object of the invention to present a processing gripper that enables a more compact design while retaining the basic advantages of the existing gripper. This object is achieved by a processing gripper made up of a tool having an axially displaceable tool plunger, which, with a first end and an opposite work rest, forms a working region or a working gap and can be moved with the first end towards and away from the work rest. The processing gripper has a hydraulic actuating device for applying a force to the tool plunger via a movable pressure-transmitting element, the force moving the tool plunger in the direction of the work rest.

SUMMARY OF THE INVENTION

The advantage of the invention is, in particular, that the press ram or plunger in its retracted position or starting position is accommodated at least partially in the pressure cylinder or in the piston there or in the piston rod, so that the dimensions of the pressure transfer element in the direction of the axis of the press ram can be much smaller than the stroke of the press ram.

To eliminate this disadvantage, it has already been suggested to provide the pressure cylinder so that it is radially movable to the axis of the press ram, which however entails a more complex design due to the high pressure forces that have to be transferred from the pressure cylinder to the press ram.

The invention is characterized by a reduced overall height with a simplified design.

BRIEF DESCRIPTION OF THE DRAWINGS

The invention is described below based on the drawings with sample embodiments, as follows.

DETAILED DESCRIPTION OF THE INVENTION

Figure 1:
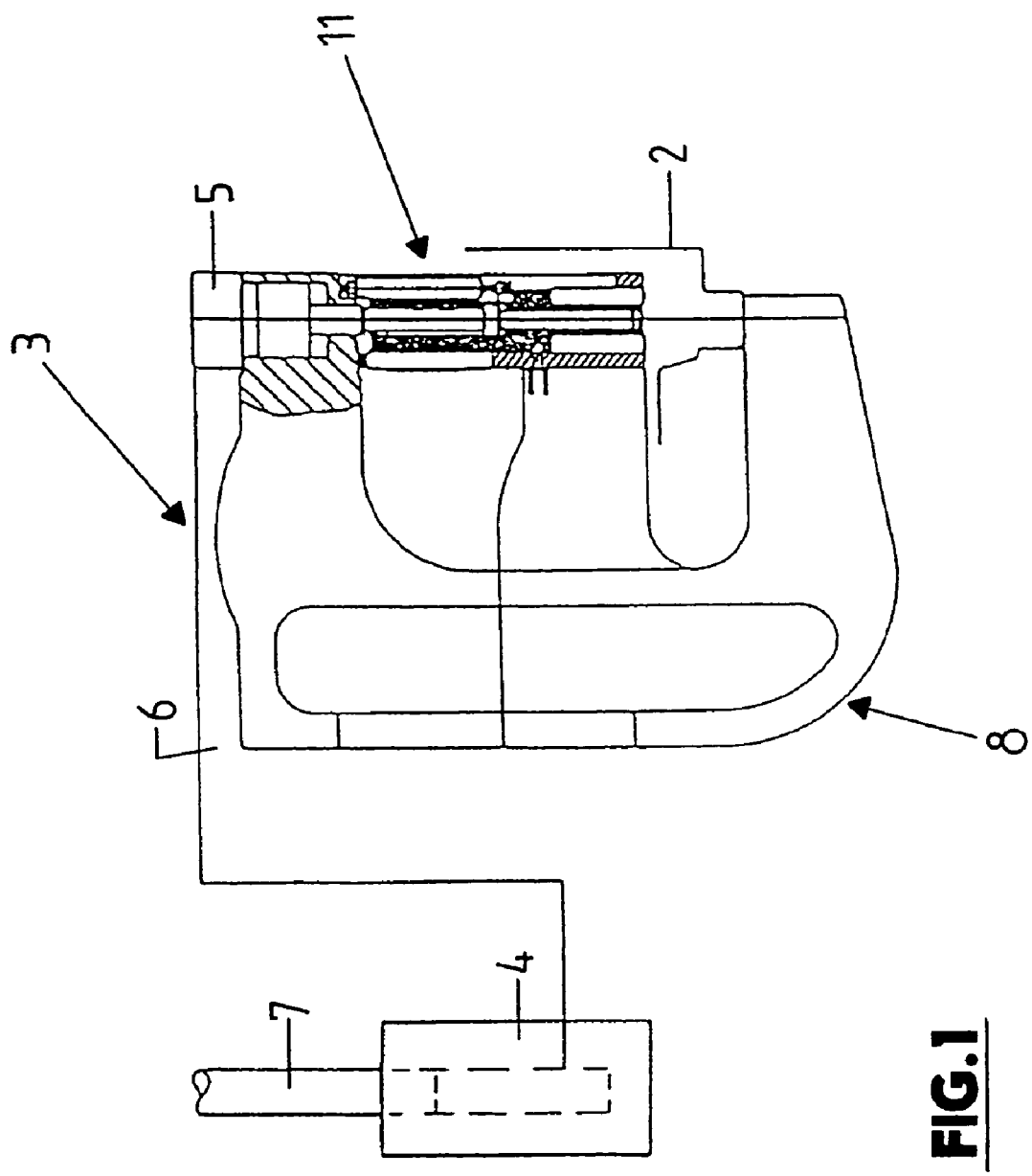
FIG. 1 the elements of a work station for inserting components, for example connecting elements, in a workpiece.

The work station depicted in FIG. 1 is used for the insertion of components, e.g. for the insertion of nuts 1 in workpieces 2 made of sheet metal.

The work station includes a workplace comprising a C-shaped or setting gripper 3 and of a hydraulic working cylinder 4 that drives the setting gripper 3 and is spatially separate from this gripper. The working cylinder 4, or its working piston 4.1, is actuated in the depicted embodiment by a motor (not depicted), via a threaded spindle 7. The setting gripper 3 or a pressure cylinder 5 located there and the working cylinder 4 are connected with each other by means of a hydraulic pressure line 6.

The setting gripper 3, which is fastened to a machine frame or a mount (not depicted), consists of a C-shaped gripper frame 8 comprising the gripper arms 8.1 and 8.2 and the yoke section 8.3 connecting the arms. By means of the yoke section the gripper 8 is also fastened to a machine frame (not depicted). A tool head 9 with a matrix-type tool element 10 is provided on the arm 8.1 depicted as the lower arm in the drawings.

A punching head-shaped pressing tool 11 is fastened to the other gripper arm 8.2, which is opposite the gripper arm 8.1 and depicted in the drawings as the upper arm. The pressing tool 11 is depicted only schematically in the drawings and consists essentially of a ram or plunger 12, which is movably guided in a housing 13 fastened to the gripper arm 8.2 for an axial stroke in the plunger axis AP, extends with a partial length over the side of the housing 13 facing the gripper arm 8.1, and supports a tool element 14 on the end of the partial length. The tool element 14 together with the tool element 10 joins and fixes (by pressing) the respective components 1 in the workpiece 2.

Figure 2:
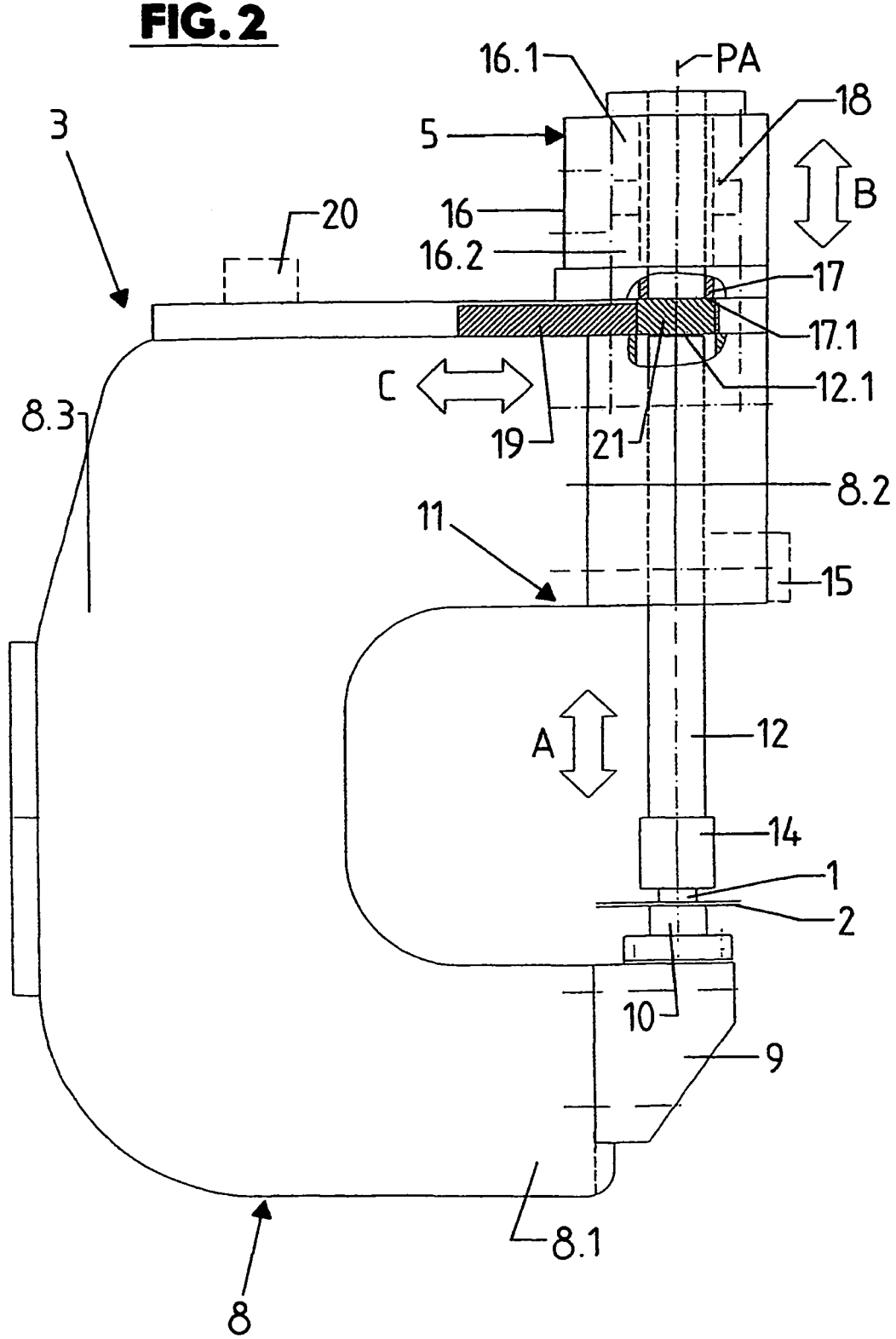
FIGS. 2 and 3 a processing or setting gripper of the workstation in FIG. 1 in various operating states.

A special characteristic of the setting gripper 3 or of the pressing tool 11 is that the closing of the setting gripper 3, i.e. the moving of the plunger 12 with the tool element 14 and the components 1 to be inserted from the plunger starting position toward the workpiece 2 or into the plunger working position and the re-opening of the setting gripper 3, i.e. the moving of the tool element 14 away from the workpiece 2 and the moving back of the plunger 12 into its plunger starting position, takes place by axial movement of the plunger 12 with a large stroke A, namely by a drive 15 indicated schematically in FIG. 2, for example a pneumatic, electric or hydraulic drive, which effects this axial movement of the plunger 12 with relatively little force. The pressing of the components 1 takes place with great force and a short stroke B by the pressure cylinder 5, which is provided on the top of the housing 13.

Figure 3:
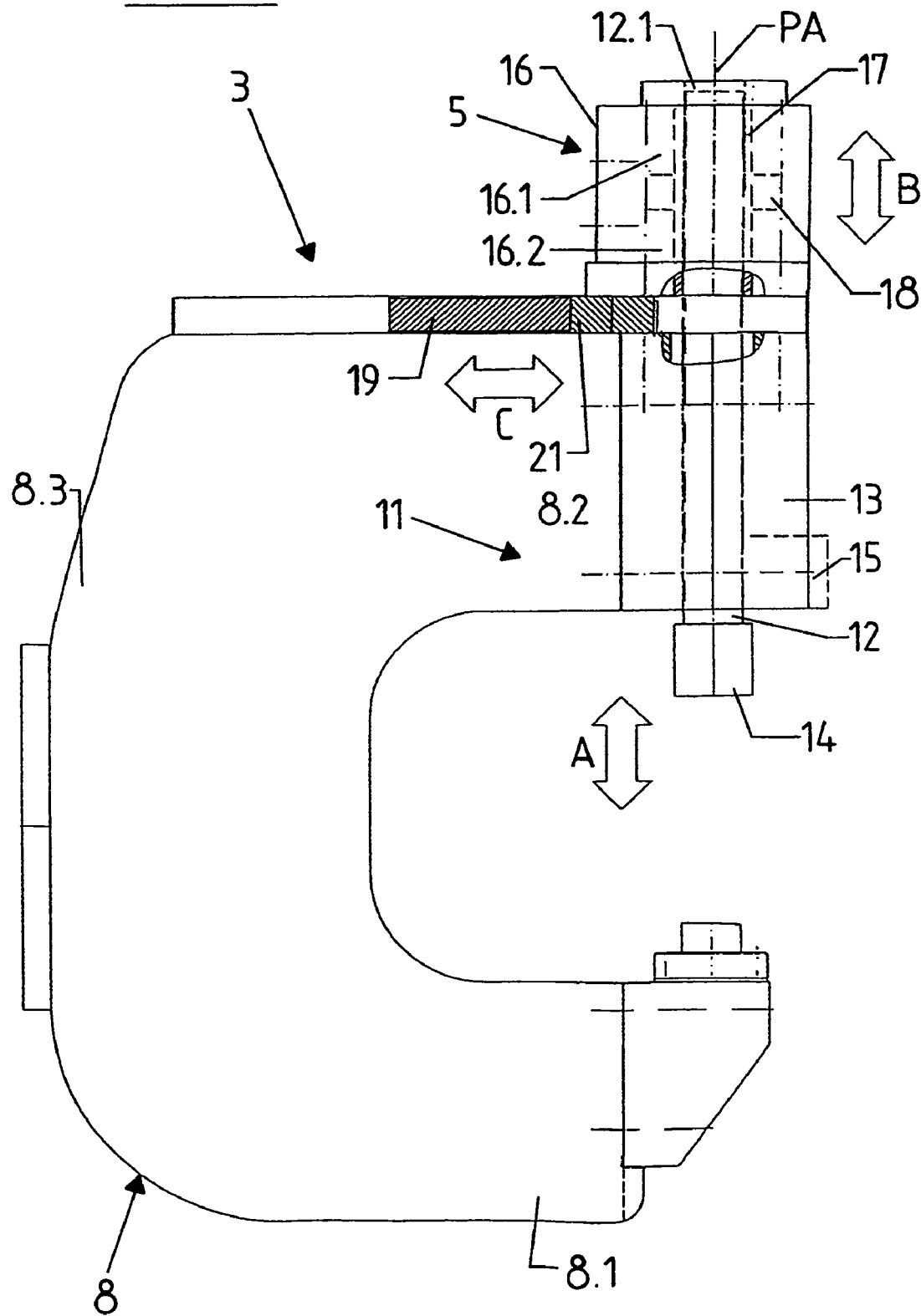

The pressure cylinder 5, as schematically depicted in FIGS. 2 and 3, consists of a cylinder housing 16 and a piston rod 17 that is axially movable in the cylinder housing 16 with a piston 18. The piston 18 delimits two cylinder chambers 16.1 and 16.2, of which the cylinder chamber 16.1 can be pressurized with the hydraulic pressure of the working cylinder 4 during pressing.

The axis of the piston rod 17 is the same as the axis AP of the plunger 12. The piston rod 17 is designed as a hollow rod, namely with an inner diameter that is somewhat larger than the outer diameter of the plunger 12 so that the plunger 12 in its raised, i.e. retracted plunger starting position, in which the tool element 14 is at the greater distance from the tool element 10 and therefore the setting gripper 3 is opened, is accommodated with a partial length in the piston rod 17. This results in a low overall height for the setting gripper 3.

To create the necessary driven connection between the piston rod 17 and the plunger 12 for pressing, a slide 19 is movably guided (double arrow C) on the top of the gripper arm 8.2 radially to the setting gripper axis AP, namely by a drive 20. The drive 20 is an electric motor, hydraulic or pneumatic drive. A pressure plate 21 is provided or guided in the slide 19 so that it can be moved in the slide with a short stroke in an axis direction parallel to the axis SA.

By means of the drive 20, the slide 19 can be moved from a starting position, in which the slide 19 including the pressure plate 21 is completely outside the sphere of movement of the plunger 12 (FIG. 3), into a working position in which the slide 19 and its pressure plate 21 are located on the same axis as the axis SA.

The functional principle of the setting gripper 3 is shown in FIGS. 2 and 3. It is assumed that the setting gripper 3 is opened. In this case the plunger, in the case of the slide 19 being retracted into the starting position, is moved upward by the drive 15 until the tool element 14 is at the greater distance from the tool element 10 and the upper partial length of the plunger 12 is accommodated in the piston rod 17 designed as a hollow rod. After insertion of the workpiece 2, the setting gripper 3 is closed, i.e. the plunger 12 is moved downward by the drive 15 into the plunger working position so that the tool element 14 bears with the functional element 1 already present on said tool element against the workpiece 2. The upper end 12.1 of the plunger 12 is then in the plane of the bottom of the slide 19 and of the pressure plate 21 or somewhat lower. However in any case the upper end 12.1 of the plunger 12 is at a distance below the lower end 17.1 of the piston rod 17, which is at the level or somewhat above the level of the top of the slide 19 and the top of the pressure plate 21.

Afterwards, the drive 20 moves the slide 19 from its starting position into the working position (arrow C). In the working position the pressure plate 21 is between the end 17.1 of the piston rod 17 and the top 12.1 of the plunger 12, so that the pressure plate 21 creates a driven connection between the piston rod 17 and the plunger 12. By pressurizing the cylinder chamber 16.1 with the hydraulic pressure supplied by the working cylinder 4, the functional element 1 (e.g. nut) can be pressed in the workpiece 2 (e.g. sheet metal part) with a short stroke B via the piston rod 18, the pressure plate 21, the plunger 12 and the tool element 14.

After pressing, the slide 19 moves back to its starting position so that the plunger 12 can be moved back up via the drive 15 to open the setting gripper 3 and the upper length of the plunger 12 is again accommodated in the piston rod 17. The retraction of the piston 18, is achieved for example, by pressurizing the cylinder chamber 16.2 with the hydraulic pressure.

Figure 4:
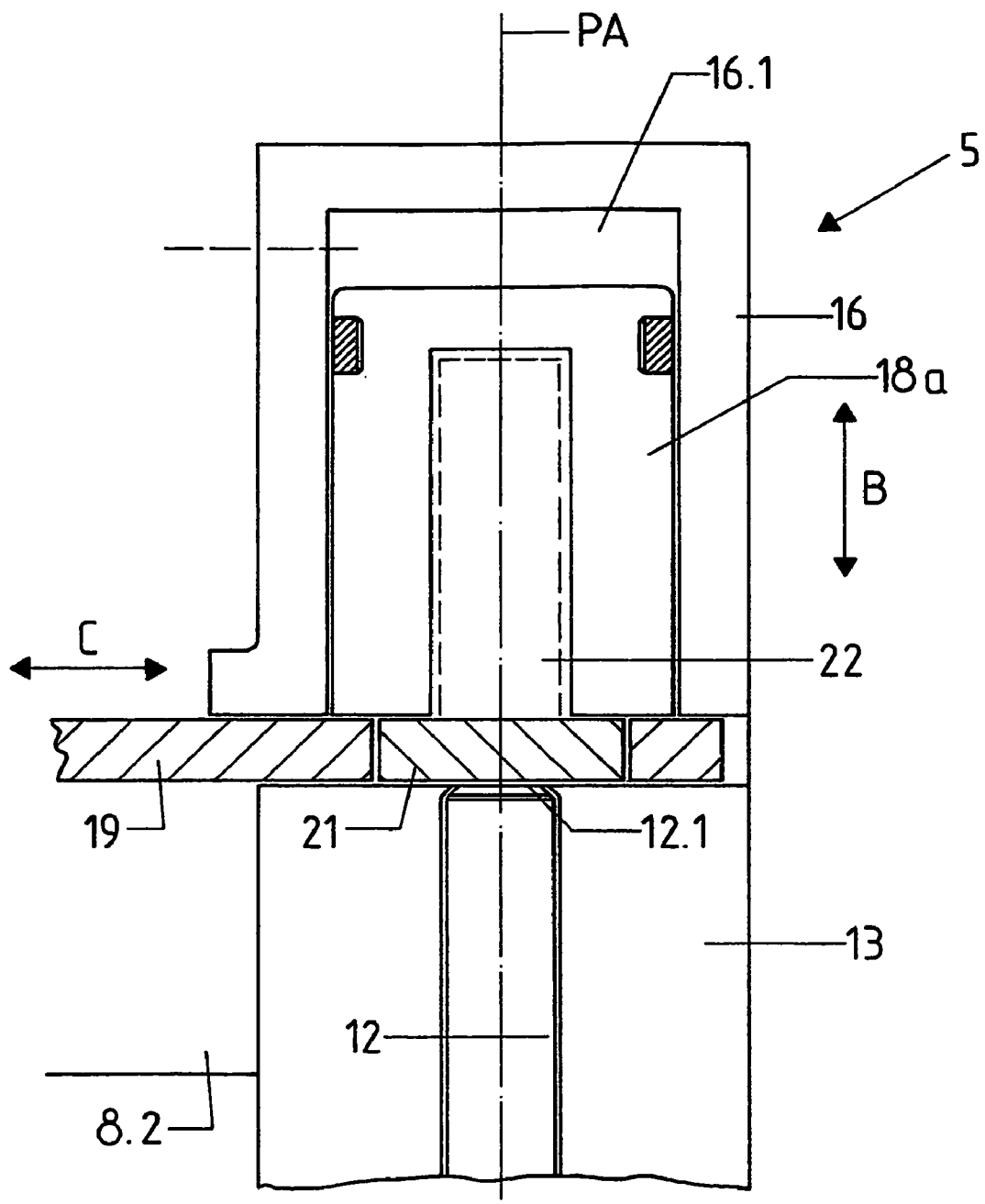
FIG. 4 a schematic representation of the pressure cylinder of the processing gripper in a further possible embodiment.

It was assumed above that the piston rod 17 is designed as a hollow tube. Fundamentally, other designs are also possible. For example, and as shown in FIG. 4, it is also possible to use instead of the piston 18 a piston 18a, which is axially guided in the cylinder chamber of the cylinder housing 16 and has a suitable ratio of piston length to piston diameter for this purpose. The piston 18a is provided with an opening 22, which is open on the side facing the plunger 12 and in which the plunger 12 is accommodated with a partial length in the plunger starting position. For pressing, the opening 22 is then again closed by the pressure plate 21, i.e. the latter is located between the piston 18a and the upper plunger end 12.1.

Further, it is possible to design in particular the tool element 14 so that it has a corresponding hold-down device, which for example presses the workpiece 2 against the tool element 10 prior to pressing and holds it in position there.

The invention was described above based on sample embodiments. It goes without saying that numerous modifications and variations are possible without abandoning the underlying inventive idea of the invention; all embodiments have in common that the piston or the piston rod of the pressure cylinder 5 is designed so that a partial length of the plunger 12 is accommodated in this pressure cylinder when the setting gripper is open.

REFERENCE LIST

1 functional element, for example nut
2 workpiece
3 setting gripper
4 working cylinder
5 pressure cylinder
6 hydraulic pressure hose
7 threaded spindle
8 C-shaped gripper frame
8.1, 8.2 gripper arm
8.3 section
9 tool head on gripper arm 8.1
10 tool element
11 pressing tool
12 plunger
12.1 top end of plunger 12
13 housing
14 tool element
15 drive
16 cylinder housing of pressure cylinder 5
16.1, 16.2 cylinder chamber
17 piston rod
17.1 end of piston rod 17
18, 18a piston
19 slider
20 drive for slider 19
21 pressure plate
22 opening
A feed movement of plunger 12 or of tool element 14
B movement stroke of pressure cylinder 5
C movement of slide 19

What is claimed is:

1. A hydraulic processing gripper for machining workpieces, comprising:

a tool with an axially movable tool plunger moved by a first auxiliary drive from a plunger starting position to a plunger working position, in which the tool plunger bears against a workpiece, the first auxiliary drive comprising a hydraulic actuating device by means of which the tool plunger in the plunger working position is pressurized via a pressure transfer element with increased axial force, the pressure transfer element being movable between a pressure transfer element working position, in which it is located between a piston of the hydraulic actuating device and the tool plunger, and a pressure transfer element starting position, in which the pressure transfer element provides a space for the return movement of the tool plunger into the plunger starting position, wherein the piston has a hollow space, in which the tool plunger is held at least with a partial length in its plunger starting position, and that the pressure transfer element in its pressure transfer element starting position forms a bearing surface for the tool plunger on the piston of the hydraulic actuating device for closing the hollow space of the piston.

2. The hydraulic processing gripper according to claim 1, wherein the pressure transfer element is moved between the pressure transfer element starting position and the pressure transfer element working position radially to the axis of the tool plunger or to the axis of the piston of the hydraulic actuating device.

3. The hydraulic processing gripper according to claim 1, wherein the pressure transfer element is a pressure element, which in the pressure transfer element working position is located between a surface of the tool plunger between an end of the tool plunger facing away from the pressure transfer element and a surface of the piston of the hydraulic actuating device facing the plunger.

4. The hydraulic processing gripper according to claim 1, wherein the piston is a hollow rod in which the tool plunger is accommodated at least with a partial length in the plunger starting position.

5. The hydraulic processing gripper according to claim 1, wherein the pressure transfer element is located in a slide and is moved with the slide between the pressure transfer element starting position and the pressure transfer element working position.

6. The hydraulic processing gripper according to claim 1, wherein the piston has a hollow space for accommodating the tool plunger in the plunger starting position.

* * * * *